(12) United States Patent
Yamaji

(10) Patent No.: US 8,585,082 B2
(45) Date of Patent: Nov. 19, 2013

(54) HORN SWITCH DEVICE AND AIRBAG DEVICE

(75) Inventor: Naoki Yamaji, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/509,811

(22) PCT Filed: Dec. 15, 2010

(86) PCT No.: PCT/JP2010/072535
§ 371 (c)(1),
(2), (4) Date: May 15, 2012

(87) PCT Pub. No.: WO2011/078027
PCT Pub. Date: Jun. 30, 2011

(65) Prior Publication Data
US 2012/0228855 A1    Sep. 13, 2012

(30) Foreign Application Priority Data

Dec. 25, 2009 (JP) ................................ 2009-294203

(51) Int. Cl.
*B60R 21/16* (2006.01)
(52) U.S. Cl.
USPC ........................................................ 280/731
(58) Field of Classification Search
USPC .............................. 280/731; 200/61.54, 61.55
See application file for complete search history.

(56) References Cited

U.S. PATENT DOCUMENTS

| 5,294,147 | A * | 3/1994 | Edge .......................... 280/728.3 |
| 7,159,897 | B2 * | 1/2007 | Worrell et al. ................. 280/731 |
| 7,887,088 | B2 * | 2/2011 | Worrell et al. ................. 280/731 |
| 7,891,698 | B2 * | 2/2011 | Umemura et al. ......... 280/728.2 |
| 7,891,699 | B2 * | 2/2011 | Worrell et al. ............. 280/728.3 |
| 2009/0091107 | A1 * | 4/2009 | Shimazaki et al. ........... 280/731 |

FOREIGN PATENT DOCUMENTS

| JP | 61 182370 | 11/1986 |
| JP | 2000 276971 | 10/2000 |
| JP | 2007 45237 | 2/2007 |

OTHER PUBLICATIONS

International Preliminary Report on Patentability Issued Aug. 23, 2012 in PCT/JP2010/072535 filed Dec. 15, 2010 (with English translation).
International Search Report issued on Mar. 15, 2011 in PCT/JP10/072535 filed on Dec. 15, 2010.

* cited by examiner

*Primary Examiner* — Faye M. Fleming
(74) *Attorney, Agent, or Firm* — Oblon, Spivak, McClelland, Maier & Neustadt, L.L.P.

(57) ABSTRACT

A horn switch device installed in a steering wheel includes: an ornament including a biasing projection provided to project on a back surface side thereof; a covering in which a recessed portion and a through hole are formed, the recessed portion being configured such that the ornament is mounted so as to move to be pushed thereinto and return therefrom, the through hole being configured in a bottom of the recessed portion; and a switch mechanism turned on and off in response to press and return movements of the ornament. The biasing projection penetrates the bottom of the recessed portion and projects from a back surface side thereof. The back-surface-side projecting part of the biasing projection is engaged with a biasing member on the back surface side of the covering. The biasing member receives a pressing force of the ornament and biases the ornament in the return direction.

21 Claims, 10 Drawing Sheets

F I G. 1
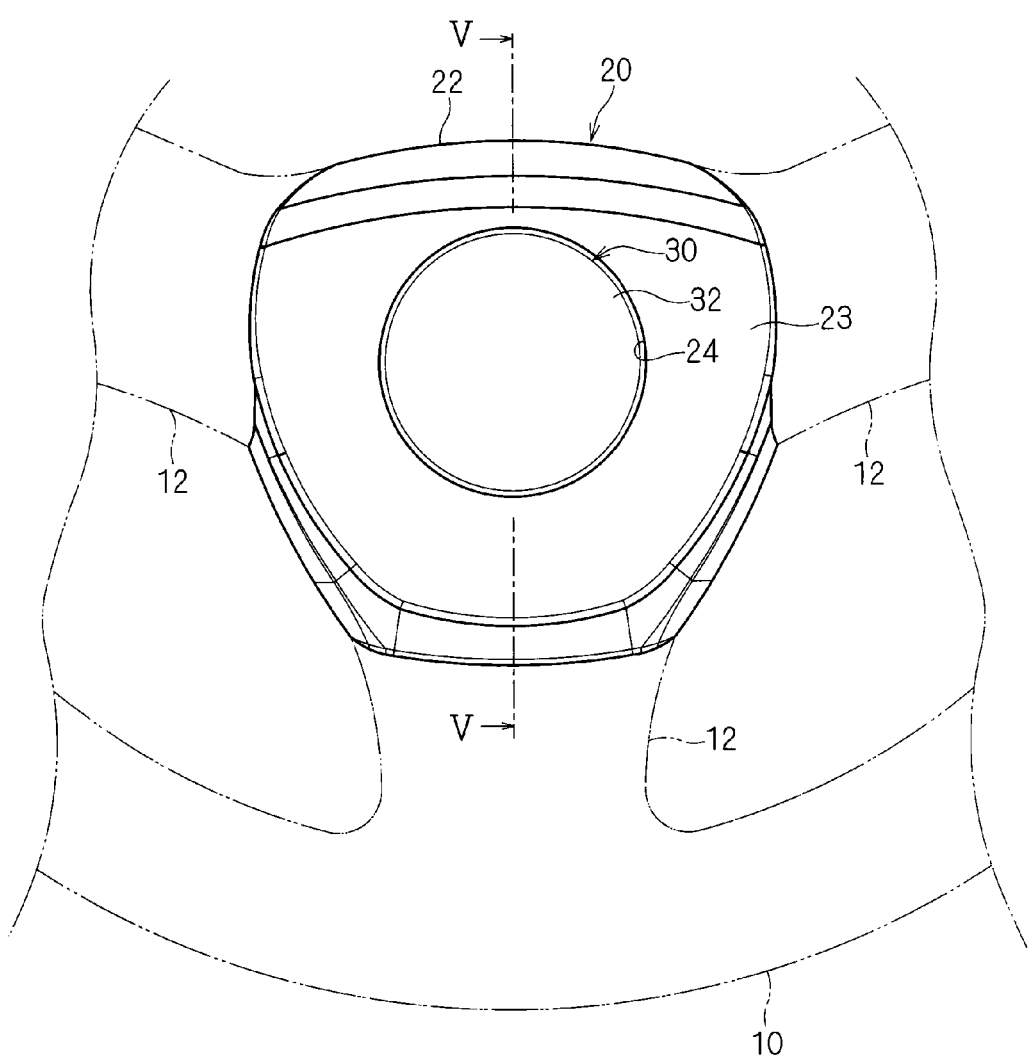

F I G. 2
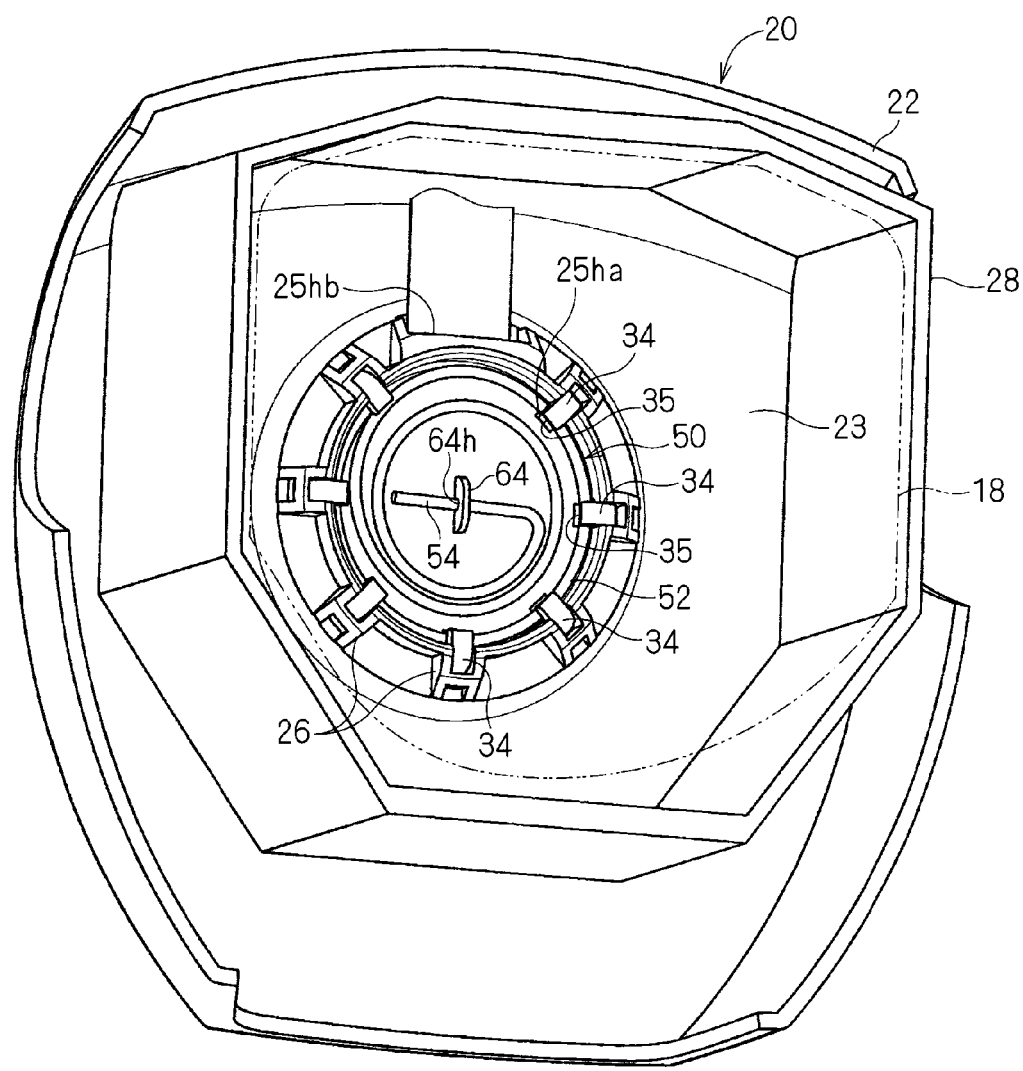

F I G. 5
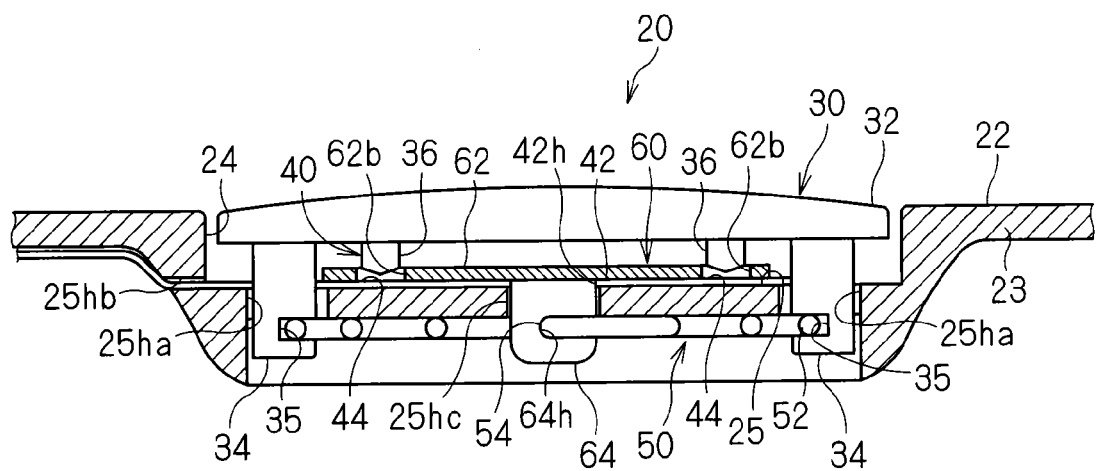

F I G. 8
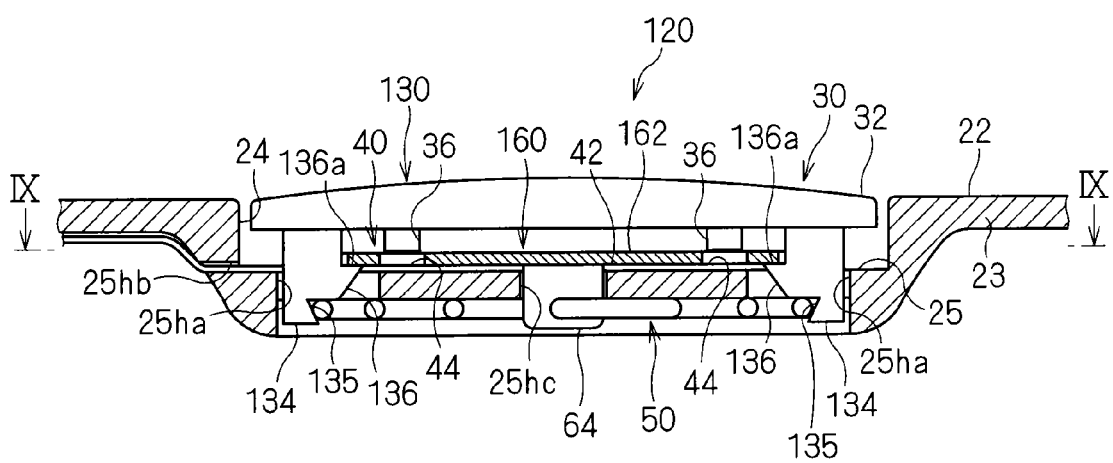

HORN SWITCH DEVICE AND AIRBAG DEVICE

TECHNICAL FIELD

The present invention relates to a horn switch device and an airbag device installed in a steering wheel of a vehicle.

BACKGROUND ART

Conventionally, there is a horn switch device disclosed in Patent Document 1 as a horn switch device installed in a steering wheel.

In Patent Document 1, a switch is disposed between an ornament mounting portion formed in a covering that houses an airbag and an ornament mounted to the ornament mounting portion so as to advance and retract. This switch includes an electrode which includes a positive electrode portion and a negative electrode portion, a conductor which closes the electrode, and an elastic spacer which biases the electrode and the conductor toward an opening direction. The configuration is made such that upon pressing of the ornament, the conductor is pressed against the electrode against the biasing force of the elastic spacer, and accordingly, the positive electrode portion and the negative electrode portion are closed.

PRIOR ART DOCUMENT

Patent Document

Patent Document 1: Japanese Patent Application Laid-Open No. 2007-45237

SUMMARY OF THE INVENTION

Problem to be Solved by the Invention

In Patent Document 1, unfortunately, the elastic spacer is disposed between the ornament mounting portion and the ornament. Accordingly, the space in which the elastic spacer is disposed is restricted, which makes it difficult to, for example, install the configuration for achieving good operational feeling.

Therefore, an object of the present invention is to dispose the configuration in which an ornament is biased in the direction in which the ornament goes apart from a covering, at a position other than a position between the covering and the ornament.

Means to Solve the Problem

In order to solve the above-mentioned problem, a first aspect relates to a horn switch device installed in a steering wheel, which includes: an ornament including a biasing projection provided to project on a back surface side thereof; a covering in which a recessed portion and a through hole are formed, the recessed portion being configured such that the ornament is mounted so as to move to be pushed thereinto and return therefrom, the through hole being configured in a bottom of the recessed portion such that the biasing projection is arranged to pass therethrough; a switch mechanism turned on and off in response to press and return movements of the ornament into and from the covering; and a biasing member provided on a back surface side of said covering, and receiving a pressing force of said ornament and biasing said ornament in a return direction upon abutment against a back-surface-side projection of said biasing projection, said back-surface-side projection passing through said through hole to project toward the back surface side of said covering.

According to a second aspect, in the horn switch device of the first aspect, a plurality of the biasing projections are provided along an outer periphery of the ornament.

According to a third aspect, in the horn switch device of the second aspect, the biasing member includes an annular part obtained by bending a linear body into an annular shape along the outer periphery of the ornament, and the back-surface-side projecting parts of the biasing projections abut against the annular part.

According to a fourth aspect, in the horn switch device of the third aspect, the biasing member is a conical spring.

According to a fifth aspect, the horn switch device of any one of the first to fourth aspects further includes a fixing member including a bottom fixing plate portion configured to be disposed on the bottom of the recessed portion and a fixing projection projecting toward a back surface side of the bottom fixing plate portion, wherein: a fixing through hole is formed in the bottom of said recessed portion such that the fixing projection is arranged to pass therethrough; and the biasing member is fixed to a tip portion of the back-surface-side projecting part of said fixing projection so as to be fixed to said covering, said back-surface-side projecting part passing through said fixing through hole and projecting toward said back surface side of said covering.

According to a sixth aspect, in the horn switch device of the fifth aspect, the plurality of biasing projections are provided along the outer periphery of the ornament; and the fixing projection is fixed to the biasing member at approximately the center position surrounded by the plurality of biasing projections.

According to a seventh aspect, in the horn switch device of the fifth or sixth aspect, the switch mechanism includes a sheet-like switch and a switch pressing portion provided to project on the back surface side of the ornament; and at least a part of the sheet-like switch is sandwiched between the bottom of the recessed portion and the bottom fixing plate portion.

According to an eighth aspect, in the horn switch device of the seventh aspect, the sheet-like switch includes a contact portion entering a contact state upon pressing of the switch pressing portion; a pressing-portion insertion hole is formed in the bottom fixing plate portion such that the switch pressing portion is inserted thereinto; and the bottom fixing plate portion covers a periphery of the contact portion of the sheet-like switch.

According to a ninth aspect, in the horn switch device of any one of the fifth to eighth aspects, the biasing projection includes an anti-dropping abutment surface facing a proximal end side thereof, and the ornament is prevented from dropping in a return direction thereof upon abutment of the anti-dropping abutment surface against the bottom fixing plate portion.

According to a tenth aspect, in the horn switch device of any one of the first to sixth aspects, the switch mechanism includes a first contact portion provided on the covering side and a second contact portion provided on the ornament side, the first contact portion and the second contact portion being provided at positions so as to come into contact with each other upon pressing of the ornament.

An airbag device according to an eleventh aspect includes the horn switch device according to any one of the first to tenth aspects, and an airbag mechanism included in the covering.

Effects of the Invention

According to the first aspect, the biasing projection is provided to project on the back surface side of the ornament, and the through hole is formed in the bottom of the recessed portion. A biasing member is provided on a back surface side of the covering, and receives a pressing force of the ornament and biases the ornament in a return direction upon abutment against a part of the biasing projection, the part passing through the through hole to project toward the back surface side of the covering. This enables to dispose the biasing member biasing the ornament toward the direction in which the ornament goes apart from the covering at the position other than the position between the covering and the ornament on the back surface side of the covering.

According to the second aspect, a plurality of biasing projections provided along the outer periphery of the ornament abut against the biasing member, so that the pressing force of the ornament is distributed around the outer periphery of the ornament and received. This enables to achieve stable operational feeling and operability and excellent strength.

According to the third aspect, the back-surface-side projecting parts of the plurality of biasing projections abut against the one annular part obtained by bending a linear body. This allows the one annular part to receive the pressing force of the ornament, leading to stable operational feeling and operability.

According to the fourth aspect, the biasing member is a conical spring, which makes the biasing member compact.

According to the fifth aspect, the biasing member can be fixed to the covering more reliably.

According to the sixth aspect, the tip portion of the fixing projection projecting toward the back surface side of the covering and the biasing member are fixed at approximately the center position surrounded by the plurality of biasing projections. This stabilizes the operational feeling and operability around the outer periphery of the ornament.

According to the seventh aspect, the sheet-like switch can be fixed with a simple configuration.

According to the eighth aspect, the sheet-like switch can be held at a constant position more reliably.

According to the ninth aspect, the ornament can be prevented from dropping more reliably.

According to the tenth aspect, it is not required to provide the sheet-like switch or the like between the covering and the ornament, which enables to arrange the covering and the ornament more close to each other in a compact manner.

According to the eleventh aspect, the biasing member that biases the ornament in a direction in which the ornament goes apart from the covering can be disposed at the position other than the position between the covering and the ornament on the back surface side of the covering.

BRIEF DESCRIPTION OF DRAWINGS

FIG. 1 is a front view showing a steering wheel in which a horn switch device according to an embodiment is installed.

FIG. 2 is a perspective view showing the horn switch device from a rear surface side thereof.

FIG. 5 is a schematic explanatory view of the horn switch device.

FIG. 8 is a schematic explanatory view showing a horn switch device according to a first modification.

EMBODIMENTS FOR CARRYING OUT THE INVENTION

Hereinafter, a horn switch device and an airbag device according to an embodiment are described.

Figure 3:
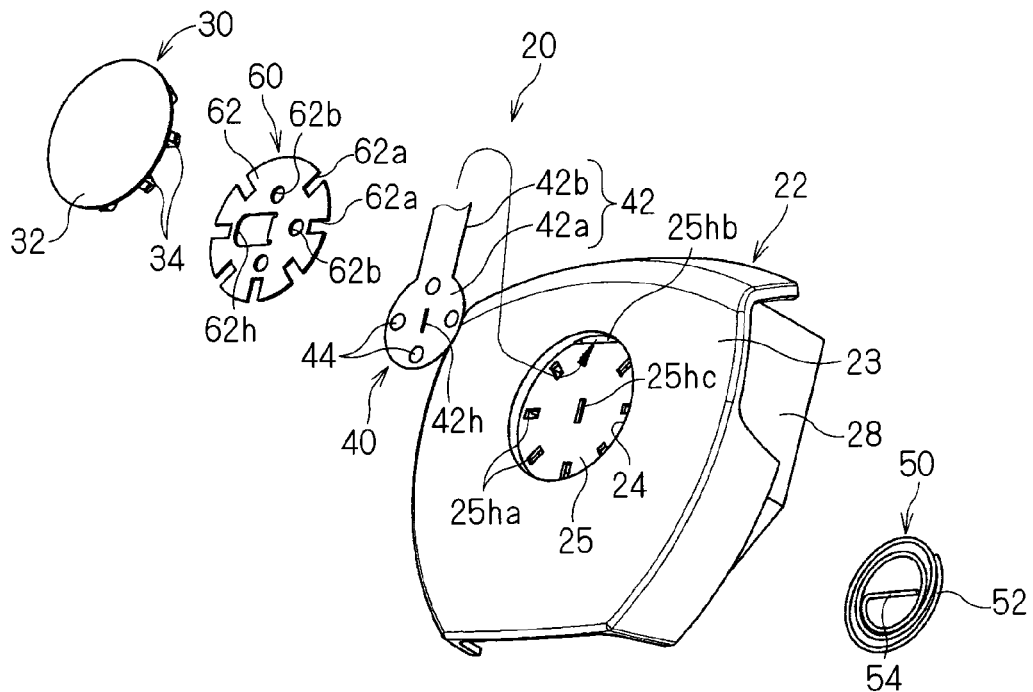
FIG. 3 is an exploded perspective view showing the horn switch device from a front surface side thereof.
Figure 4:
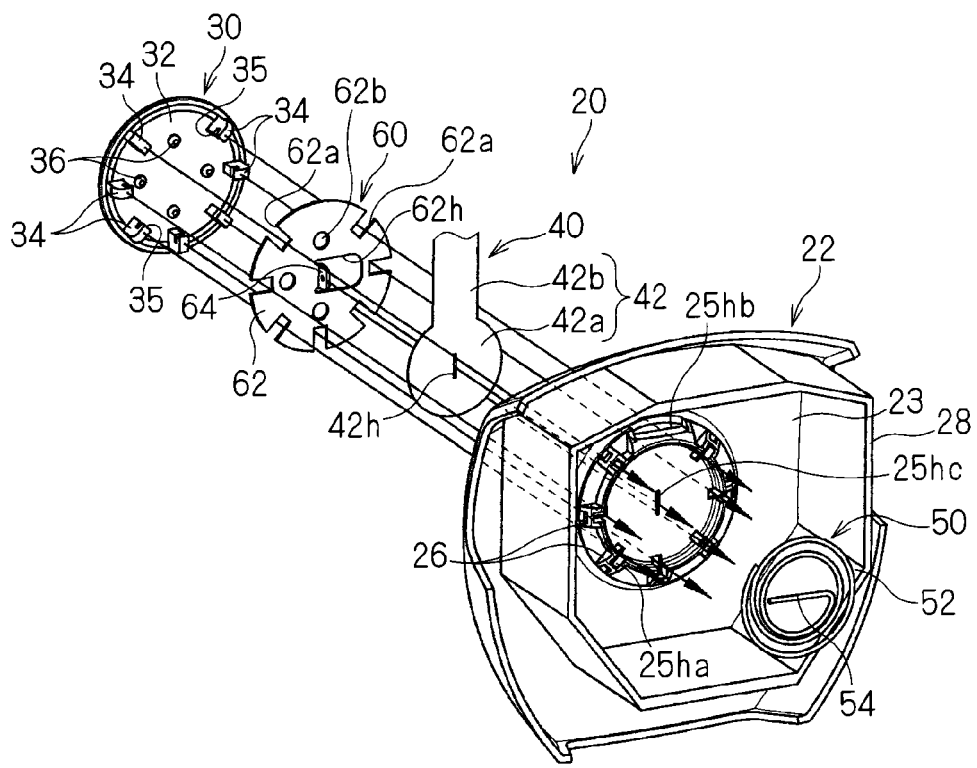
FIG. 4 is an exploded perspective view showing the horn switch device from the rear surface side thereof.
Figure 6:
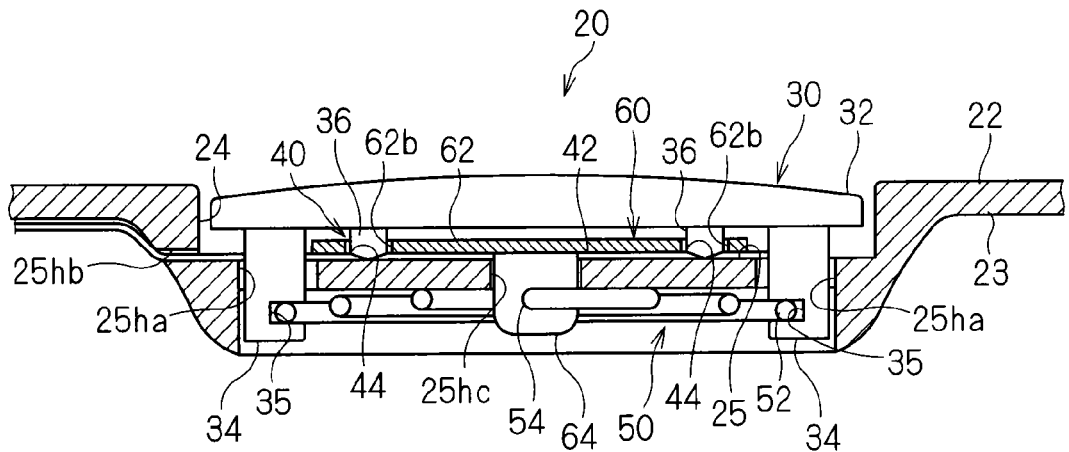
FIG. 6 is another schematic explanatory view of the horn switch device.
Figure 7:
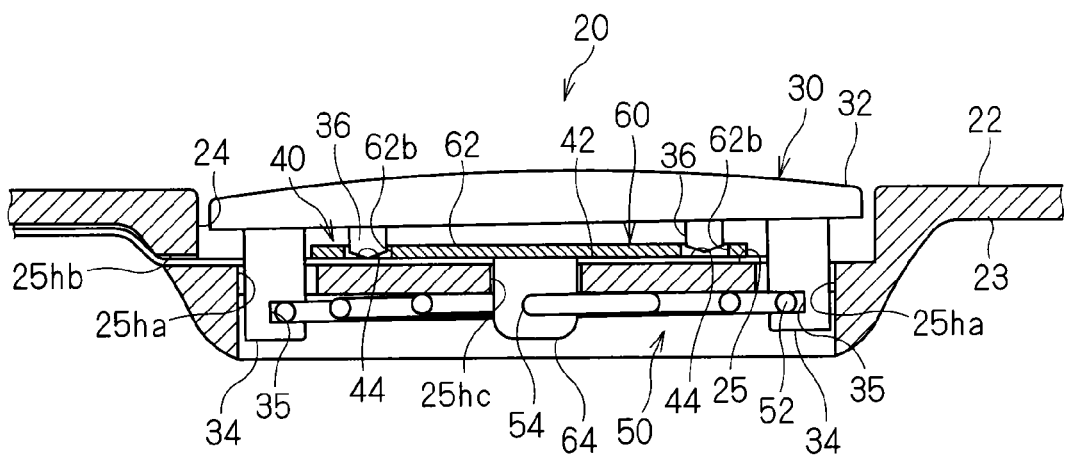
FIG. 7 is still another schematic explanatory view of the horn switch device.

FIG. 1 is a front view showing a steering wheel 10 in which a horn switch device 20 according to an embodiment is installed, FIG. 2 is a perspective view showing the horn switch device 20 from a rear surface side thereof, FIG. 3 is an exploded perspective view showing the horn switch device 20 from a front surface side thereof, and FIG. 4 is an exploded perspective view showing the horn switch device 20 from the rear surface side thereof. FIG. 5 to FIG. 7 are schematic explanatory views describing the operation of the horn switch device 20. Fundamentally, FIG. 5 to FIG. 7 and similar schematic explanatory views below are schematic cross-sectional views taken along a line V-V of FIG. 1, where parts that are not shown in the original cross-sectional views (biasing projections 34, biasing member 50 and the like on the side on which a wire is drawn) are shown for the sake of description.

The horn switch device 20 is installed in the steering wheel 10 in a state of being integrally assembled with an airbag mechanism 18.

The steering wheel 10 is disposed in front of a vehicle driver's seat, which is a member for changing the direction of wheels in response to an operation of a driver. The steering wheel 10 is an approximately annular member, and is coupled to a steering boss located at an end portion of a steering shaft via a plurality of spokes 12.

The airbag mechanism 18 includes an airbag expandable and deployable into a bag shape and an inflator that causes the airbag to expand and deploy. The airbag is folded and housed in a covering 22 of the horn switch device 20 in a normal state. The inflator is integrated with the airbag in such a manner that gas can be introduced into the airbag. Upon detection of an impact such a vehicle collision, the inflator operates in response to a detection signal from an impact detection device (not shown), and the gas from the inflator is introduced into the airbag. As a result, the airbag thrusts and splits a front cover part of the covering 22 of the horn switch device 20 to expand and deploy beyond the steering wheel 10.

The horn switch device 20 includes the covering 22, an ornament 30, a switch mechanism 40 and a biasing member 50. Schematically, the ornament 30 is mounted onto the covering 22 disposed at approximately the center part of the steering wheel 10 so as to move to be pressed thereinto and return therefrom. The ornament 30 is biased in the return direction by the biasing member 50. When the ornament 30 is pressed against the biasing force of the biasing member 50, the switch mechanism 40 turns on, whereby a horn (now shown) blows.

To describe each configuration more specifically, the ornament 30 is a member formed of a resin or the like and includes an ornament body 32 having an approximately plate shape and the biasing projections 34 provided on the ornament body 32 to protrude. Note that a part of the ornament 30, for example, a part having an ornamental shape may be partially made of other materials such as metal.

One-side main surface (front surface) of the ornament body 32 is decorated with an ornamental shape such as a symbolic shape (so-called emblem) of a manufacturer or car. Description is given here of an example in which the ornament body 32 has an approximately disc shape, which may have other shape such as oval shape or polygonal plate shape.

Meanwhile, the biasing projections 34 are provided to project on the other-side main surface (back surface) of the ornament body 32. In this case, a plurality of biasing projections 34 are provided along an outer periphery of the ornament body 32. More specifically, the biasing projections 34 are provided to project at positions except one (in this case, respective positions except the upper one) among the positions at which the outer periphery of the ornament body 32 is divided almost evenly into a plurality of parts (in this case, eight). Note that one of the positions for almost even division is excluded for installing the switch mechanism 40. Therefore, the biasing projections may be provided to project at all positions for almost even division, depending on the configuration of a switch mechanism to be installed.

The biasing projection 34 is formed as a rod-shaped member that penetrates the covering 22 and has a length dimension enough to project toward the back surface side thereof. Formed at the tip portion of the biasing projection 34 is a biasing-member engaging recess 35 that is open toward approximately the center of the ornament body 32. In an extending direction (direction in which the ornament body 32 moves to be pressed and return) of the biasing projection 34, an opening dimension of the biasing-member engaging recess 35 is set to be approximately identical to the thickness dimension of the biasing member 50 described below. Further, as described below, the biasing member 50 is engaged with the biasing-member engaging recess 35 on the tip side of the biasing projection 34 with little gap in the extending direction of the biasing projection 34, on the back surface side of the biasing member 50.

On the other-side main surface of the ornament body 32, switch pressing portions 36 are provided to project. In this case, the switch pressing portions 36 are provided at positions at which the ornament body 32 is almost evenly divided into a plurality of parts (in this case, four) on the inner peripheral side of the biasing projections 34. The projecting dimension of the switch pressing portion 36 is set such that the switch pressing portion 36 abuts against a connecting portion 44 of a sheet-like switch 42 described below when the ornament 30 mounted to the covering 22 is pressed and that the switch pressing portion 36 is not in contact with the contact portion 44 of the sheet-like switch 42 when the ornament 30 returns. In this case, the projecting dimension of the switch pressing portion 36 is set to a length dimension to an extent that the switch pressing portion 36 does not reach the contact portion 44 of the sheet-like switch 42 in a state in which the ornament 30 is not pressed (return state). Note that the switch pressing portion 36 constitutes the switch mechanism 40 together with the sheet-like switch 42 described below.

The covering 22 is a member formed of a resin or the like and is disposed at approximately the center of the steering wheel 10. The covering 22 is normally attached to the steering boss located at approximately the center of the steering wheel 10 via a bracket (not shown). The covering 22 covers the steering boss and the airbag mechanism 18 to serve as a protection member and a design member.

More specifically, the covering 22 includes a cover body 23 that covers approximately the center of the steering wheel 10 and has a bowl-like shape and an enclosure portion 28 provided to project on the back surface side of the cover body 23.

The airbag mechanism 18 is housed and arranged in the enclosure portion 28. Therefore, the space for housing the airbag mechanism 18 can be ensured as much as possible by making the horn switch device 20 according to the present embodiment compact.

Formed in the cover body 23 is a recessed portion 24 that is bottomed and is open toward a front surface side (occupant side). The recessed portion 24 is formed into a recess shape such that the ornament 30 can be mounted so as to move to be pressed into and return therefrom. More specifically, the recessed portion 24 is formed into a recess (in this case, approximately circular hole shape) having a front-view shape corresponding to the ornament body 32 of the ornament 30, and has a depth dimension set to be larger than the thickness dimension of the ornament body 32.

Through holes 25ha are formed in a bottom 25 of the recessed portion 24 such that the biasing projections 34 are arranged to pass therethrough. A plurality of (in this case, seven) through holes 25ha are formed at positions respectively corresponding to the biasing projections 34. When the ornament 30 is mounted onto the recessed portion 24, the respective biasing projections 34 pass through the through holes 25ha, and the tip portions of the respective biasing projections 34 project on the back surface side of the cover body 23.

On the back surface side of the cover body 23 which is also the outer peripheral side of the through holes 25ha, receptacles 26 are provided to project, so as to abut against the biasing projections 34 that project. The receptacle 26 abuts against the biasing projection 34 from the outer peripheral side thereof, and accordingly prevents the biasing projection 34 from deforming toward the outer peripheral side, which serves to prevent disengagement between the biasing-member engaging recess 35 of the biasing projection 34 and the biasing member 50.

Formed in an upper-side wall portion of the recessed portion 24 is a wiring through hole portion 25hb that pierces the cover body 23 from the recessed portion 24 to the back surface side thereof. In this case, the wiring through hole portion 25hb is formed into a long slender slit-like hole shape along the direction of the bottom 25 of the recessed portion 24, and the sheet-like switch 42 described below passes through the wiring through hole portion 25hb and is drawn from the recessed portion 24 toward the back surface side of the cover body 23.

A fixing through hole 25hc is formed in the bottom 25 of the recessed portion 24 such that a fixing projection 64 described below is arranged to pass therethrough. In this case, the fixing through hole 25hc is formed at approximately the center of the bottom 25. The fixing through hole 25 is formed into a slit shape that is oblong vertically. Needless to say, the formation number, position and shape of the fixing through hole 25hc are not limited thereto, which may be provided such that the fixing projection 64 is arranged to passes therethrough in accordance with the formation number, position and shape of the fixing projection 64.

The switch mechanism 40 is a switch for operating the horn of a vehicle, which is configured so as to turn on off in accordance with the press and return movements of the ornament 30 into and from the covering 22.

More specifically, the switch mechanism 40 includes the switch pressing portions 36 and the sheet-like switch 42. The sheet-like switch 42 is a sheet-like switch that can be disposed along the bottom 25 and includes the contact portions 44 at positions corresponding to the switch pressing portions 36. The contact portions 44 are normally apart from each other, and include a pair of contacts rendered conductive upon pressing. Then, the configuration is made such that the switch pressing portions 36 press the contact portions 44 upon pressing of the ornament 30, and accordingly, the pair of contacts are rendered conductive and the switch mechanism 40 turns on. Various switches having a sheet shape such as a so-called membrane switch are adoptable as the sheet-like switch 42 including such contact portions 44. Note that the membrane switch is configured such that, for example, a pair of resin films are kept to be apart from each other by a spacer, a curved shape thereof or the like and that a pair of contacts or the like are formed on an inner surface of the pair of resin films so as to render the pair of contacts conductive upon elastic deformation of the resin films by pressing.

In this case, the sheet-like switch 42 includes a circular switch portion 42a that can be disposed on the inner side of the respective biasing projections 34 in the bottom 25 and a belt-like wiring part 42b extending outwardly from the circular switch portion 42a. Formed at approximately the center portion of the circular switch portion 42a is a fixing through hole 42h having the shape and size corresponding to the fixing through hole 25hc. Further, wiring connected to the respective contacts of the contact portions 44 is formed in the part of the sheet-like switch 42 in which a wire is drawn from the respective contact portions 44 to the outside via the belt-like wiring part 42b. Then, in the state in which the circular switch portion 42a is disposed in the bottom 25 such that the respective contact portions 44 face the tip portions of the switch pressing portions 36, the belt-like wiring part 42b passes through the wiring through hole portion 25hb and is guided into the covering 22. In this state, the circular switch portion 42a is sandwiched and fixed between the bottom 25 and a bottom fixing plate portion 62 described below. The belt-like wiring part 42b is connected to the horn, power source and the like of the vehicle via other electric wire, so that the horn blows upon turning-on of the switch mechanism 40.

Note that the positions, number and the like of the contact portions 44 are not limited thereto, which can be appropriately changed in accordance with the positions, number and the like of the switch pressing portions 36. For example, in case where only one switch pressing portion is provided at approximately the center of the bottom, only one contact portion may be provided at approximately the center of the bottom.

The biasing member 50 is provided on the back surface side of the covering 22, which is configured so as to receive the pressing force of the ornament 30 and bias the ornament 30 in the return direction.

More specifically, the biasing member 50 is a conical spring obtained by bending a linear spring member being a linear body into a conical shape. The outer-peripheral-side end portion of the biasing member 50 of the linear spring member is formed into an annular part 52 that is bent into an annular shape along the outer periphery of the ornament 30. Meanwhile, the inner-peripheral-side end portion of the biasing member 50 of the linear spring member is formed into a linear part 54 extending in a diameter direction passing through approximately the center of the annular part 52 (approximately the center portions of the ornament 30 and bottom 25).

The linear part 54 of the biasing member 50 is disposed so as to pass through approximately the center portion on the back surface side of the bottom 25 and is fixed to the back surface side of the bottom 25. The configuration of fixing the linear part 54 is described below. In this state, the biasing member 50 is disposed on the back surface side of the bottom 25, and the annular part 52 thereof is disposed along the outer periphery of the bottom 25. The annular part 52 is fitted into the biasing-member engaging recesses 35 at the tip portions of the biasing projections 34, on the back surface side of the covering 22. That is, the biasing-member engaging recesses 35 of the biasing projections 34 provided annularly are engaged with the one annular part 52 at intervals. When the biasing projections 34 are pressed toward the direction in which they project toward the back surface side of the covering 22 upon pressing of the ornament 30 by, for example, a driver's hand, the annular part 52 moves so as to go apart from the back surface of the covering 22, so that the biasing member 50 elastically deforms into a conical spring shape. That is, the biasing member 50 receives the pressing force of the ornament 30. Then, the biasing projections 34 are pressed toward the direction in which they retract from the back surface side of the covering 22 by an elastic restoring force of the biasing member 50 as a conical spring, so that the ornament 30 is biased in the return direction. Upon this, the pressing force on the ornament 30 is released by a driver or the like, whereby the ornament 30 moves to return to the original position.

Note that the biasing member 50 is only required to serve as a conical spring that biases the ornament 30 toward the return direction upon pressing of the ornament 30, irrespective of whether or not the biasing member 50 is a conical spring in a natural state.

Further, the horn switch device 20 includes a fixing member 60 as the configuration for fixing the biasing member 50.

The fixing member 60 is a member formed by, for example, appropriately punching and bending a metal plate or the like, which includes the bottom fixing plate portion 62 and the fixing projection 64.

The bottom fixing plate portion 62 is formed into a plate shape so as to be disposed in the bottom 25 of the recessed portion 24. More specifically, the bottom fixing plate portion 62 is formed approximately into a disc shape corresponding to the shape of the bottom 25, and notched recesses 62a are formed at positions corresponding to the respective biasing projections 34. In addition, pressing-portion insertion holes 62b into which the switch pressing portions 36 can be inserted are formed. In this case, the pressing-portion insertion holes 62b into which the tip portions of the switch pressing portions 36 can be inserted are formed at the respective positions corresponding to part (in this case, three) of the switch pressing portions 36 among a plurality of (in this case, four) switch pressing portions 36. The sheet-like switch 42 is sandwiched and fixed between the bottom fixing plate portion 62 and the bottom 25 in the state in which the contact portions 44 (in this case, three contact portions 44) of the sheet-like switch 42 are respectively disposed in the pressing-portion insertion holes 62b and the bottom fixing plate portion 62 covers the parts around the contact portions 44 of the sheet-like switch 42. As a result, upon pressing of the ornament 30, the switch pressing portions 36 pass through the pressing-portion insertion holes 62b to press the contact portions 44. Note that the other (one) switch pressing portion 36 is caused to face the corresponding switch pressing portion 36 through a hole part 62h that becomes a lancing mark of the fixing projection 64 described below.

The fixing projection 64 is formed so as to project toward the back surface side of the covering 22. In this case, the fixing projection 64 is a plate-like part formed by cutting out approximately the center part of the bottom fixing plate portion 62 into a U-shape and bending and raising it. Formed at the tip portion of the fixing projection 64 is a fixing hole 64h into which the linear part 54 can be inserted. The fixing projection may be attached and fixed to the bottom fixing plate portion by screwing, welding or the like.

In the state in which the bottom fixing plate portion 62 is disposed in the bottom 25, the fixing projection 64 passes through the fixing through hole 42h of the sheet-like switch 42 and the fixing through hole 25hc of the bottom 25 to project toward the back surface side of the covering 22. The position at which the fixing projection 64 projects is approximately the center position on the back side of the bottom 25, that is, approximately the center position surrounded by the plurality of biasing projections 34. The linear part 54 of the biasing member 50 is inserted into and fixed to the fixing hole 64h of the fixing projection 64 that projects toward the back surface side of the covering 22 in this manner, so that the linear part 54 of the biasing member 50 is fixed to the covering 22 at a constant position.

The method of assembling the horn switch device 20 is described.

First, the sheet-like switch 42 is installed in the recessed portion 24 such that the circular switch portion 42a is disposed in the bottom 25 of the recessed portion 24 while inserting the belt-like wiring part 42b of the sheet-like switch 42 into the wiring through hole portion 25hb.

Next, the fixing member 60 is disposed in the recessed portion 24, and the circular switch portion 42a of the sheet-like switch 24 is sandwiched between the bottom 25 and the bottom fixing plate portion 62. On this occasion, the contact portions 44 of the sheet-like switch 42 are disposed in the pressing-portion insertion holes 62b or the hole part 62h so that the contact portions 44 are exposed through the pressing hole insertion holes 62b or the hole part 62h. Meanwhile, the fixing projection 64 of the fixing member 60 is caused to pass through the fixing through hole 42h of the sheet-like switch 42 and the fixing through hole 25hc of the bottom 25, so that the tip portion thereof is caused to project toward the back surface side of the covering 22.

After that, the biasing member 50 is disposed on the back surface side of the bottom 25, so that the linear part 54 on the center side thereof is caused to pass through the fixing hole 64h of the fixing projection 64. As a result, the linear part of the biasing member 50 is fixed to the cover body 23.

Then, the ornament body 32 is disposed in the recessed portion 24 such that the biasing projections 34 of the ornament 30 respectively pass through the through holes 25ha of the cover body 23. In addition, the annular part 52 of the biasing member 50 is engaged with the biasing-member engaging recesses 35 at the tip portions of the biasing projections 34 that pass through the through holes 25ha and project toward the back surface side of the bottom 25. On this occasion, the biasing member 50 is formed of a spring member, and accordingly, if the annular part 52 elastically deforms so as to have a smaller diameter, the annular part 52 is easily engaged with a plurality of biasing-member engaging recesses 35.

The horn switch device 20 is assembled as described above. An airbag device is completed when the airbag mechanism 18 is installed in the horn switch device 20.

The operation of the horn switch device 20 configured in this manner is described.

First, the ornament 30 is biased in the return direction (direction toward the front surface of the cover body 23) by the biasing member 50 in the normal state (see FIG. 5). In this state, the switch pressing portions 36 are not in contact with the contact portions 44. It is preferable that in this state, the front surface of the ornament 30 be disposed so as to be continuous from the front surface of the cover body 23.

When a driver or the like presses approximately the center portion of the front surface of the ornament body 32 of the ornament 30 in this state, the annular part 52 of the biasing member 50 is pressed in a direction in which the ornament 30 goes apart form the back surface side of the bottom 25 via the biasing projections 34, and the biasing member 50 elastically deforms (see FIG. 6). Then, the switch pressing portions 36 come into contact with the contact portions 44 through the pressing-portion insertion holes 62b. If the ornament 30 is pressed further, the switch pressing portions 36 press the contact portions 44 with larger force, so that the switch mechanism 40 changes from an off state to an on state. This causes the horn to blow.

After that, upon releasing of the force for pressing the ornament 30, the ornament 30 is biased in the return direction via the biasing projections 34 by the elastic restoring force of the biasing member 50. Accordingly, the ornament 30 moves so as to return to the original position, and the force for pressing the contact portions 44 by the switch pressing portions 36 is released, whereby the switch mechanism 40 changes from the on state to the off state. As a result, the horn stops blowing.

The description has been given of the operation in the case where approximately the center portion of the ornament body 32 is pressed, and thus, it is assumed that the ornament 30 moves while keeping the position approximately parallel to the bottom 25. Therefore, a plurality of switch pressing portions 36 press the corresponding contact portions 44 at approximately the same time.

On the other hand, FIG. 7 shows a case where the ornament body 32 is pressed at an unbalanced position. In this case, the ornament 30 is pressed into the bottom 25 while inclining with respect to the bottom 25. In the part in which the ornament 30 is pressed most, as in the case described above, the switch pressing portions 36 press the contact portions 44 while elastically deforming the biasing member 50 via the biasing projections 34. This changes the switch mechanism 40 from the off state to the on state, whereby the horn blows.

Upon releasing of the force for pressing the ornament 30, the ornament 30 moves so as to return to the original position and the force for pressing the contact portions 44 by the switch pressing portions 36 is released by the elastic restoring force of the biasing member 50, so that the switch mechanism 40 changes from the on state to the off state. As a result, the horn stops blowing.

According to the horn switch device 20 configured as described above, the biasing projections 34 are provided to project on the back surface side of the ornament 30, and the through holes 25ha are formed in the bottom 25 of the recessed portion 24. In addition, the biasing member 50 is provided on the back surface side of the cover body 23, and the tip portions of the biasing projections 34 pass through the through holes 25ha and are engaged with the biasing member 50. As a result, the biasing member 50 receives the pressing force of the ornament 30 and biases the ornament 30 in the return direction. This results in that the biasing member 50 that biases the ornament 30 in the return direction is disposed on the back surface side of the covering 22 located in the position other than the position between the covering 22 and the ornament 30. This relaxes, for example, limitations on space in installing a biasing member, which improves the operational feeling. Further, the operation of installing the biasing member 50 as described above becomes easier.

The biasing member 50 has a function of biasing the ornament 30 in the return direction upon receiving the pressing force while preventing the ornament 30 from dropping, which reduces the number of components, makes the configuration simpler, and effectively prevents the ornament 30 from rattling.

The plurality of biasing projections 34 are provided along the outer periphery of the ornament, and the tip portions of the plurality of biasing projections 34 are engaged with the biasing member 50, whereby it is possible to receive the force for pressing the ornament 30 and cause the return force to act in a manner of being distributed on the outer periphery of the ornament 30. This enables to achieve stable operational feeling and operability on the outer periphery of the ornament 30 and also achieve excellent strength.

The back-surface-side projecting parts of the plurality of biasing projections 34 are engaged with one annular part 52 of the biasing member 50. This enables to receive the force for pressing the ornament 30 by the one annular part 52 and achieve stable operational feeling and operability on the outer periphery of the ornament 30.

Used as the biasing member 50 is a member having the configuration that exhibits the biasing force as a conical spring, whereby it is possible to make the biasing member 50 as flat as possible in a normal state. As a result, the biasing member 50 can be made thinner, and further, the overall configuration of the horn switch device 20 can be made thinner. This contributes to an increase in the space for housing the airbag mechanism 18. Further, the weight can be reduced compared with the case where, for example, a coil spring in which a part having the same diameter continues.

The fixing member 60 is disposed in the recessed portion 24, and the fixing projection 64 provided to project on the bottom fixing plate portion 62 of this member is caused to pierce the cover body 23 and protrude toward the back surface side thereof, to thereby fix the linear part 54 of the biasing member 50. Accordingly, it is possible to fix the biasing member 50 to the back surface of the covering 22 more reliably.

The linear part 54 on the center side of the biasing member 50 is fixed at approximately the center position surrounded by a plurality of biasing projections 34 by the tip portion of the fixing projection 64 that projects toward the back surface side of the covering 22, so that the distance between the position at which the biasing member 50 is fixed and the covering 22 is made approximately identical to the distance between the position at which the biasing member 50 is fixed and the plurality of biasing projections 34. This makes the force of the biasing member 50 exerted on the ornament 30 even as much as possible, leading to stable operational feeling and operability on the outer periphery of the ornament 30.

The switch mechanism 40 has the configuration including the switch pressing portions 36 provided in the ornament 30 and the sheet-like switch 42, and the sheet-like switch 42 is configured to be sandwiched and fixed between the bottom 25 and the bottom fixing plate portion 62, so that the sheet-like switch 42 can be fixed with a simple configuration more reliably. In addition, the use of the sheet-like switch 42 makes the switch mechanism 40 thinner and lighter.

Moreover, the configuration is made such that the contact portions 44 of the sheet-like switch 42 are exposed to the inside of the pressing-portion insertion holes 62b of the bottom fixing plate portion 62, and the bottom fixing plate portion 62 covers the sheet-like switch 42, which enables to keep the sheet-like switch at a constant position more reliably. This allows the switch pressing portions 36 to perform the operation of pressing the contact portions 44 more reliably.

It is preferable that the bottom fixing plate portion 62 cover the entire circular switch portion 42a other than the positions of the contact portions 44, which is not necessarily required. The bottom fixing plate portion 62 may be configured to cover at least a part of the sheet-like switch 42 other than the contact portions 44.

In the airbag device including the horn switch device 20 which has reduced weight and compact size as described above, the space for housing the airbag mechanism 18 can be made sufficiently large. Further, also when the switch part including the ornament 30 deploys together with the cover body 23 in the configuration in which the cover body 23 deploys upon expansion and deployment of the airbag, the switch part deploys smoothly owing to the reduced weight and size of the switch part.

<Modifications>

Various modifications are described based on the embodiment described above.

Figure 9:
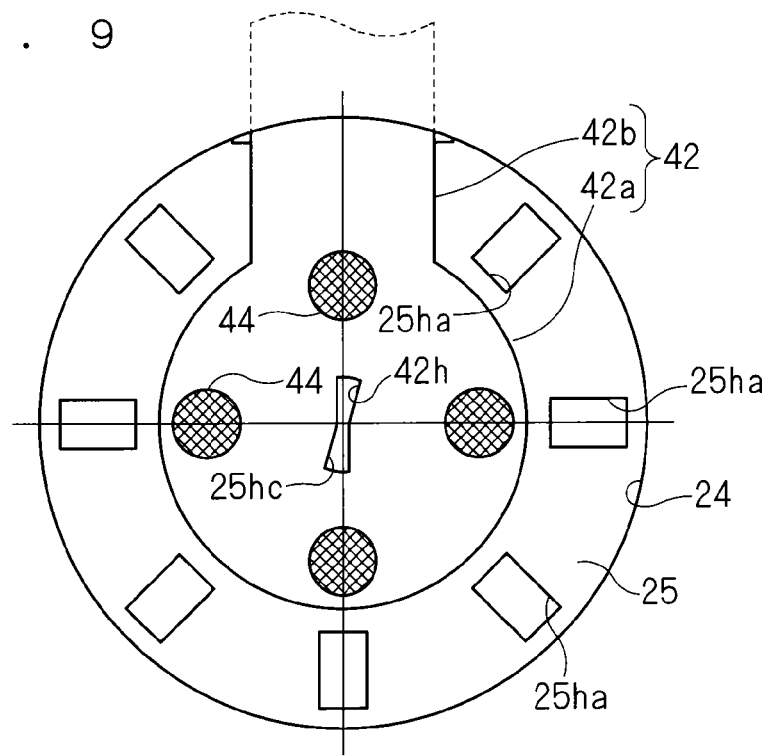
FIG. 9 is a schematic explanatory view of the horn switch device.
Figure 10:
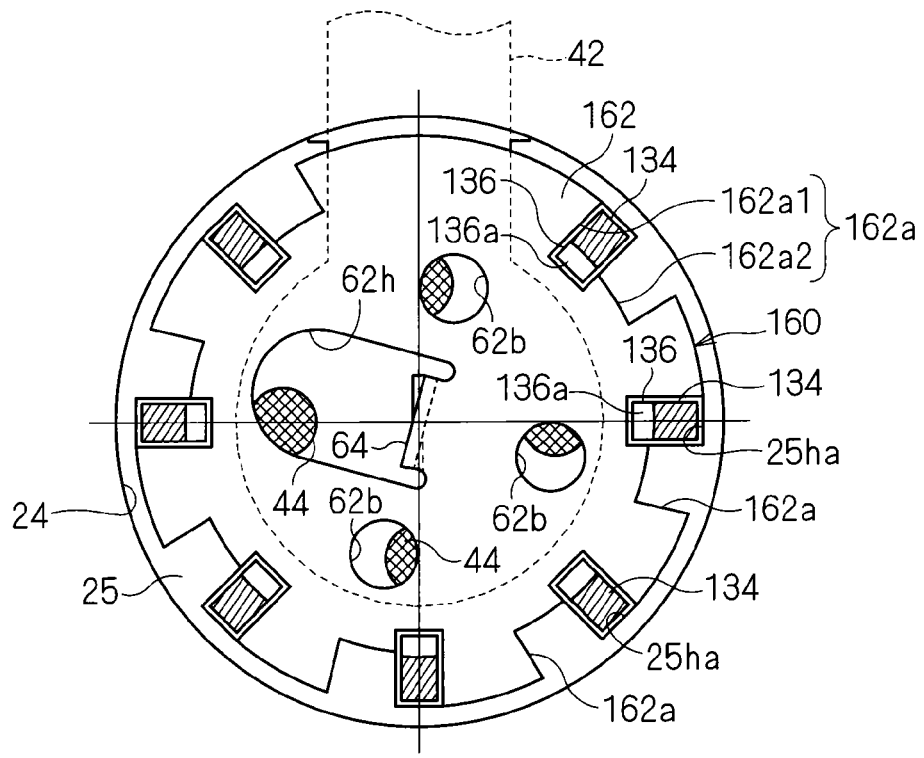
FIG. 10 is another schematic explanatory view of the horn switch device.
Figure 11:
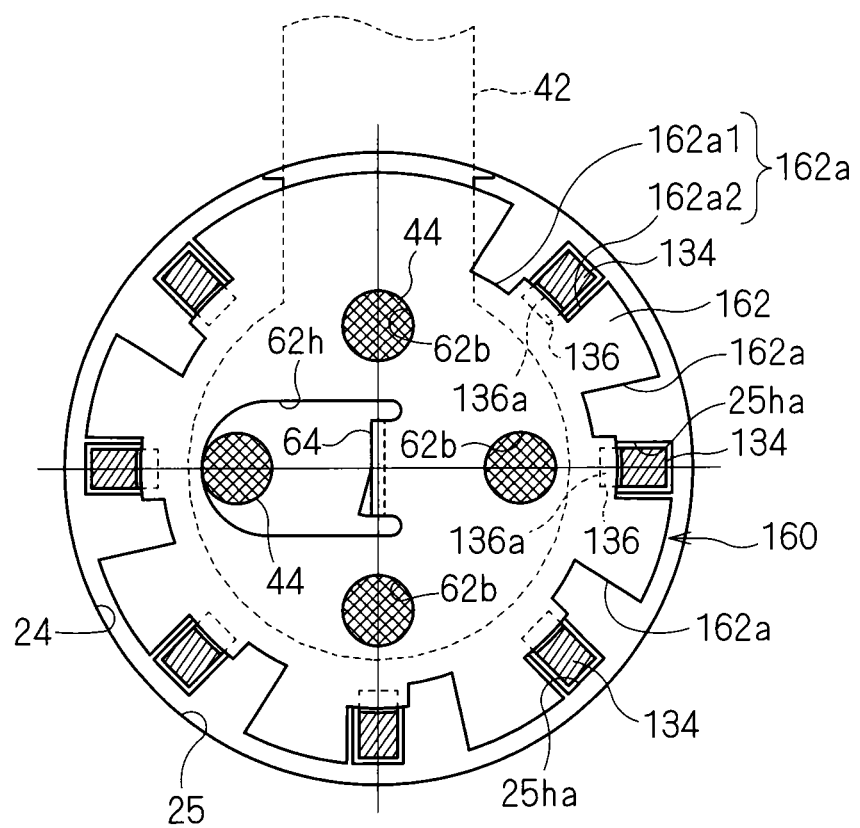
FIG. 11 is still another schematic explanatory view of the horn switch device.

FIG. 8 is a schematic explanatory view showing a horn switch device 120 according to a first modification, and FIG. 9 to FIG. 11 are schematic views illustrating the main portions taken along the line IX-IX of FIG. 8. Note that the contact portions 44 are cross-hatched in FIG. 9 to FIG. 11 for the sake of description. In the first modification, an ornament 130 and a fixing member 160 having the configurations below are used in place of the ornament 30 and fixing member 60 according to the embodiment above.

That is, the ornament 130 includes the ornament body 32 having a similar configuration to that of the ornament body 32 and biasing projections 134 corresponding to the biasing projections 34.

Formed at the tip portions of the biasing projections 134 are biasing-member engaging recesses 135 that can be engaged with the annular part 52 of the biasing member 50. Formed on a side closer to the pivotal end than the biasing-member engaging recess 135 of the biasing projection 134 is an anti-dropping protrusion 136. An anti-dropping abutment surface 136a of the anti-dropping protrusion 136 that is directed toward the ornament body 32 side (pivotal end side of the biasing projection 134) is set to be approximately flush with the inner surface of the bottom 25 in the state in which the front surface of the ornament 130 attached to the recessed portion 24 is continuous from the front surface of the covering 22. The other configuration of the biasing projection 134 is similar to that of the biasing projection 34.

The fixing member 160 includes a bottom fixing plate portion 162 that can abut against the anti-dropping abutment surface 136a. The bottom fixing plate portion 162 is a member corresponding to the bottom fixing plate portion 62 and has a notched recess 162a at a position corresponding to each biasing projection 134. The shape of the recess 162a is different from the shape of the recess 62a.

That is, the recess 162a includes an insertion recess 162a1 into which the anti-dropping protrusion 136 of the biasing projection 134 can be inserted and a non-insertion recess 162a2 that is smaller than the insertion recess 162a1 and stops the insertion of the anti-dropping protrusion 136.

More specifically, the recess 162a is an arcuate recess formed along the outer periphery of the bottom fixing plate portion 62, where one-end-side part thereof is the insertion recess 162a1 that is notched by a larger amount in the radial direction and the other-end-side part thereof is the non-insertion recess 162a2 that is notched by a smaller amount in the radial direction.

The anti-dropping abutment surface 136a of the anti-dropping protrusion 136 is caused to abut against the bottom fixing plate portion 162, so that the ornament 30 can be prevented from dropping in the return direction.

Note that the other configuration of the fixing member 160 is similar to that of the fixing member 60.

Description is given of the method of assembling the horn switch device 120 by focusing on the processes different from those of the embodiment above.

First, the sheet-like switch 42 is disposed in the recessed portion 24 (see FIG. 9).

After that, the bottom fixing plate portion 162 is disposed on the sheet-like switch 42 on the bottom 25 of the recessed portion 24, and the fixing projection 64 is caused to penetrate the sheet-like switch 42 and the bottom 25. On this occasion, the fixing member 160 is rotated as required such that the through holes 25ha of the bottom 25 are respectively disposed in the insertion recesses 162a1. The fixing through hole 42h of the sheet-like switch 42 and the fixing through hole 25hc of the bottom 25 are formed into hole shapes to an extent that the fixing projection 64 can be movably inserted therethrough for allowing the bottom fixing plate portion 162 to rotate.

Then, the ornament 130 is attached to the recessed portion 24, so that the biasing projections 134 are respectively caused to pass through the insertion recesses 162a1 and the through holes 25ha and that the anti-dropping abutment surfaces 136a are disposed at the positions recessed more compared with the inner surface of the bottom 25 (see FIG. 10).

After that, the fixing member 160 is rotated by, for example, holding the fixing projection 64 from the back surface side of the covering 22, so that the anti-dropping abutment surface 136a abuts the bottom fixing plate portion 162a on the inner peripheral side of the non-insertion recess 162a2 (see FIG. 11). Before or after the above, the biasing member 50 is mounted in a similar manner.

Figure 12:
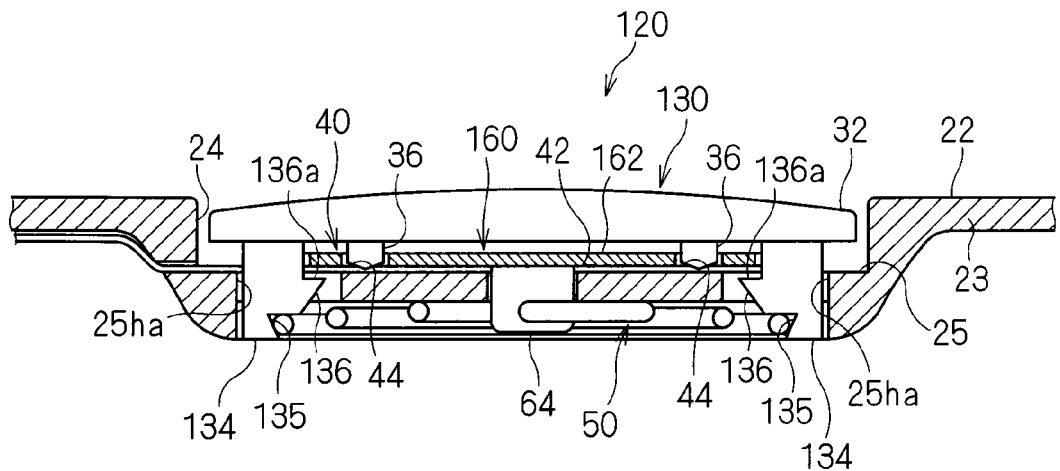
FIG. 12 is a schematic explanatory view showing the operation of the horn switch device.
Figure 13:
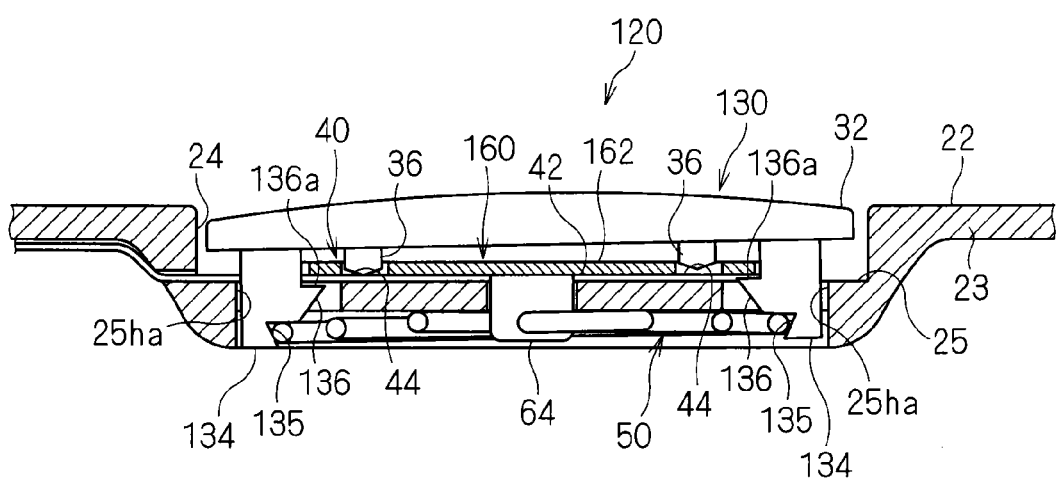
FIG. 13 is another schematic explanatory view showing the operation of the horn switch device.

FIG. 12 and FIG. 13 are schematic views illustrating the operation of the horn switch device 120.

First, as shown in FIG. 8, the biasing member 50 biases the ornament 130 in the return direction in the normal state. In this state, upon the anti-dropping abutment surface 136a abutting against the bottom fixing plate portion 162, the ornament 30 is positioned and prevented from dropping in the return direction.

When the driver or the like presses approximately the center portion on the front surface of the ornament body 32 in this state, as shown in FIG. 12, the ornament 130 is pressed via the biasing projections 134 while elastically deforming the biasing member 50. Then, the switch pressing portions 36 pass through the pressing-portion insertion holes 62b to press the contact portions 44, and accordingly, the switch mechanism 40 changes from the off state to the on state. As a result, a horn blows.

After that, the force for pressing the ornament 130 is released, and then, as shown in FIG. 13, the elastic restoring force of the biasing member 50 causes the ornament 130 to move so as to return to the original position. At the same time, the force for pressing the contact portions 44 by the switch pressing portions 36 is released, and then the switch mechanism 40 changes from the on state to the off state, whereby the horn stops blowing.

According to the horn switch device 120 configured as described above, the ornament 130 can be prevented from dropping and be held more reliably with the abutment structure of the anti-dropping abutment surface 136a and the bottom fixing plate portion 162.

In this example, the ornament 130 is prevented from dropping with the above-mentioned configuration, and thus, the biasing projections 134 and the biasing member 50 are not required to be positioned reliably in both of the press direction and return direction of the ornament 130. This simplifies the engagement structure of the biasing projections 134 and the biasing member 50. For example, the configuration may be made such that the recessed shape for engaging with the biasing projection is made shallow for easy engaging operation, or that the biasing projections and the biasing member abut against each other in the opposing direction.

That is, it is apparent from this modification that differently from the embodiment above, the biasing projections and the biasing member are not required to be engaged with each other for positioning in both of the press and return directions. That is, it suffices that the biasing member abuts against the back-surface-side projecting part of the biasing projection in such a manner that the ornament can be biased in the return direction. The configuration for preventing an ornament from dropping out of a recessed portion may be achieved by a fixing member as in the first modification or by the formation of a projection shape or the like in the recessed portion per se for preventing an ornament from dropping.

Figure 14:
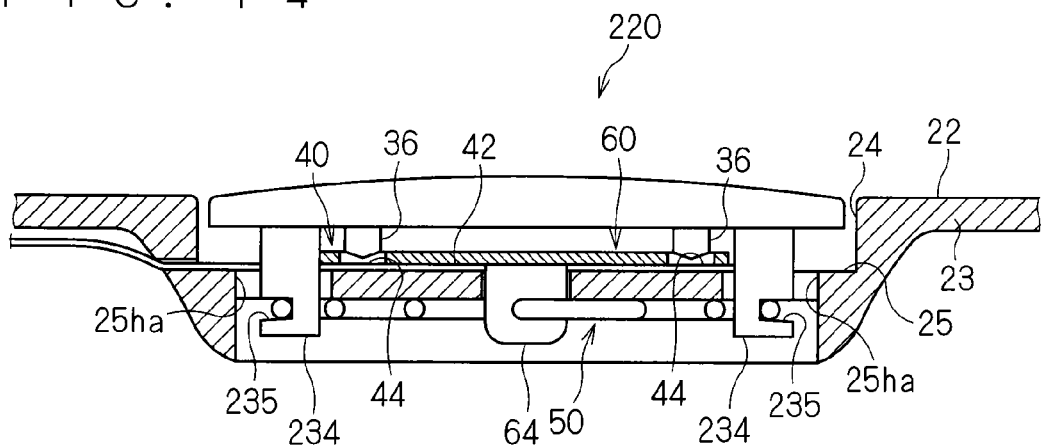
FIG. 14 is a schematic explanatory view showing a horn switch device according to a second modification.

FIG. 14 is a schematic explanatory view showing a horn switch device 220 according to a second modification.

The second modification is different from the embodiment above in that biasing projections 234 described below are used in place of the biasing projections 34.

That is, the biasing projection 234 includes a biasing-member engaging recess 235 that is open toward the outside of the ornament body 32. The biasing-member engaging recess 235 is configured so as to be engaged with the annular part 52 of the biasing member 50 from an inner peripheral side. The other configuration of the biasing projection 234 is similar to that of the biasing projection 34.

According to the second modification, the biasing-member engaging recesses 235 are engaged with the annular part 52 of the biasing member 50 from the inner peripheral side, which has an advantage that the engaging structure thereof is less likely to be detached. That is, if approximately the center portion of the ornament portion 30 is pressed strongly, the ornament body 32 may be curved and the force for outwardly opening the tip portion of the biasing projection 234 may act. However, the force for outwardly opening the tip portion of the biasing projection 234 acts as the force for causing the biasing-member engaging recess 235 and the annular part 52 of the biasing member 50 to be close to each other and be engaged with each other more strongly. For this reason, it is possible to prevent the disengagement of the biasing-member engaging recess 235 of the biasing projection 234 and the annular par 52 of the biasing member 50 more reliably.

Figure 15:
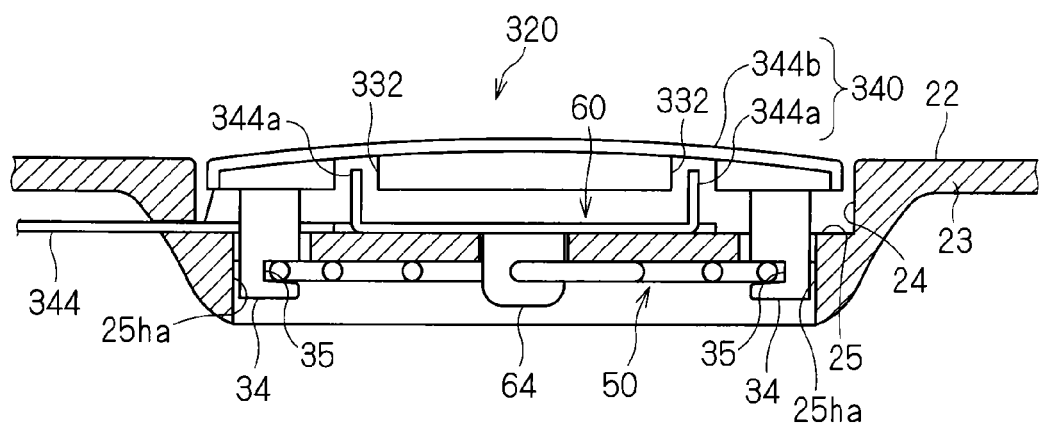
FIG. 15 is a schematic explanatory view showing a horn switch device according to a third modification.

FIG. 15 is a schematic explanatory view showing a horn switch device 320 according to a third modification.

In the third modification, a switch mechanism 340 described below is used in place of the switch mechanism 40.

That is, the switch mechanism 340 includes a first contact portion 344a provided on the covering 22 side and a second contact portion 344b provided on the ornament 30 side.

In this case, the first contact portion 344a is formed by bending a part of the fixing member 60 into a projection shape toward the ornament 30 side.

The second contact portion 344b is configured as a conductive plate part that covers the front surface of the ornament 30. Normally, a metal plate made of, for example, aluminum in which an emblem shape or the like is drawn on the surface of an ornament is assumed as the above-mentioned conductive plate part.

Formed at a part of the ornament body 32 of the ornament 30, which corresponds to the first contact portion 344a, is a hole portion 332. The first contact portion 344a passes through the hole portion 332 so as to come into contact with the second contact portion 344b.

A wire 344 connected to the first contact portion 344a and second contact portion 344b is appropriately drawn to be connected to an external horn or the like.

Upon pressing of the ornament 30, the second contact portion 344b moves closer to the first contact connection portion 344a together with the ornament 30. Then, the first contact portion 344a passes through the hole portions 332 to come into contact with the second contact portion 344b, whereby the switch mechanism 340 including the first contact portion 344a and the second contact portion 344b changes to the on state. Accordingly, the horn blows. Upon releasing of the force for pressing the ornament 30 from this state, the first contact portion 344a and the second contact portion 344b go apart from each other, whereby the switch mechanism 340 changes to the off state. Accordingly, the horn stops blowing.

According to the third modification, it is not required to provide, for example, a sheet-like switch and a part that presses this between the covering 22 and the ornament 30. Therefore, the covering 22 and the ornament 30 can be arranged so as to be more close to each other, which are made compact.

In particular, at least part of the fixing member 60 and the ornament 30 is used as a conductive member as a connection portion, which simplifies the configuration. That is, the fixing member 60 is partially processed and is used as the first contact portion 344a, which simplifies the configuration. The conductive plate part that covers the front surface of the ornament 30 is used as the second contact portion 344b, which simplifies the configuration in this respect as well.

As described above, various switch configurations in which turning-on/off is performed in accordance with the advancing/retracting movement of the ornament to/from a covering are adoptable as the switch mechanism, in addition to the example using a sheet-like switch as in the embodiment.

Note that various modifications are adoptable in addition to the first to third modifications.

For example, the description has been given of the example in which the biasing member 50 is configured to function as a conical spring in the embodiment above, which is not necessarily required. For example, a disc spring, plate spring or coil sprig can be used as the biasing member. Alternatively, the configuration may be made such that a single biasing member is provided to a plurality of biasing projections in common as in the embodiment above or that biasing members are respectively provided for a plurality of biasing projections.

The configuration for fixing the biasing member 50 to the covering 22 is not limited to the example described above. The fixing member 60 may be omitted, so that the part on the center side of the biasing member 50 is fixed to the covering 22 with an engagement structure, screwing structure, bonding structure or the like. That is, it suffices that a biasing member is fixed to the covering 22 with various fixing structures including a well-known structure.

The position at which biasing member 50 is fixed is not limited to the example described above. For example, a biasing member may be fixed around the outer periphery on the bottom back surface side of the recessed portion.

It is not necessarily required to include a plurality of biasing projections 34. For example, a single biasing projection may be provided at approximately the center portion of the ornament 30 such that the biasing projection penetrates a bottom of a recessed portion at the center portion to be engaged with the biasing member.

The description has been given of the example in which the sheet-like switch 42 is sandwiched and fixed between the bottom 25 and the bottom fixing plate portion 62 in the embodiment above, which is not necessarily required. For example, the sheet-like switch 42 may be fixed with an adhesive, screw or other member for sandwiching.

While the present invention has been described above in detail, the foregoing description is in all aspects illustrative, and the present invention is not limited thereto. That is, numerous modifications and variations can be devised in the described aspects without departing from the scope of the invention.

The invention claimed is:

1. A horn switch device installed in a steering wheel, comprising:
    an ornament including a biasing projection provided to project on a back surface side thereof;
    a covering in which a recessed portion and a through hole are formed, said recessed portion being configured such that said ornament is mounted so as to move to be pushed thereinto and return therefrom, said through hole being configured in a bottom of said recessed portion such that said biasing projection is arranged to pass therethrough;
    a switch mechanism turned on and off in response to press and return movements of said ornament into and from said covering; and
    a biasing member provided on a back surface side of said covering, and receiving a pressing force of said ornament and biasing said ornament in a return direction upon abutment against a back-surface-side projection of said biasing projection, said back-surface-side projection passing through said through hole to project toward the back surface side of said covering,
    wherein a plurality of said biasing projections are provided along an outer periphery of said ornament,
    wherein said biasing member includes an annular part obtained by bending a linear body into an annular shape along the outer periphery of said ornament, and
    wherein said back-surface-side projecting parts of said plurality of biasing projections abut against said annular part.

2. The horn switch device according to claim 1, wherein said biasing member is a conical spring.

3. The horn switch device according to claim 1, further comprising a fixing member including a bottom fixing plate portion configured to be disposed on the bottom of said recessed portion and a fixing projection projecting toward a back surface side of said bottom fixing plate portion, wherein:
    a fixing through hole is formed in the bottom of said recessed portion such that said fixing projection is arranged to pass therethrough; and
    said biasing member is fixed to a tip portion of the back-surface-side projecting part of said fixing projection so as to be fixed to said covering, said back-surface-side projecting part passing through said fixing through hole and projecting toward said back surface side of said covering.

4. The horn switch device according to claim 3, wherein:
    said plurality of biasing projections are provided along the outer periphery of said ornament; and
    said fixing projection is fixed to said biasing member at approximately a center position surrounded by said plurality of biasing projections.

5. The horn switch device according to claim 3, wherein:
    said switch mechanism includes a sheet-like switch and a switch pressing portion provided to project on a back surface side of said ornament; and at least a part of said sheet-like switch is sandwiched between the bottom of said recessed portion and said bottom fixing plate portion.

6. The horn switch device according to claim 5, wherein:
said sheet-like switch includes a contact portion entering a contact state upon pressing of said switch pressing portion;
a pressing-portion insertion hole is formed in said bottom fixing plate portion such that said switch pressing portion is inserted thereinto; and
said bottom fixing plate portion covers a periphery of said contact portion of said sheet-like switch.

7. The horn switch device according to claim 3, wherein:
said biasing projection includes an anti-dropping abutment surface facing a proximal end side thereof; and
said ornament is prevented from dropping in a return direction thereof upon abutment of said anti-dropping abutment surface against said bottom fixing plate portion.

8. The horn switch device according to claim 1, wherein said switch mechanism includes a first contact portion provided on a covering side and a second contact portion provided on an ornament side, said first contact portion and said second contact portion being provided at positions so as to come into contact with each other upon pressing of said ornament.

9. An airbag device, comprising:
the horn switch device according to claim 1; and
an airbag mechanism included in said covering.

10. An airbag device, comprising:
the horn switch device according to claim 2; and
an airbag mechanism included in said covering.

11. An airbag device, comprising:
the horn switch device according to claim 7; and
an airbag mechanism included in said covering.

12. The horn switch device according to claim 3, wherein said switch mechanism includes a first contact portion provided on a covering side and a second contact portion provided on an ornament side, said first contact portion and said second contact portion being provided at positions so as to come into contact with each other upon pressing of said ornament.

13. An airbag device, comprising:
the horn switch device according to claim 12; and
an airbag mechanism included in said covering.

14. A horn switch device installed in a steering wheel, comprising:
an ornament including a biasing projection provided to project on a back surface side thereof;
a covering in which a recessed portion and a through hole are formed, said recessed portion being configured such that said ornament is mounted so as to move to be pushed thereinto and return therefrom, said through hole being configured in a bottom of said recessed portion such that said biasing projection is arranged to pass therethrough;
a switch mechanism turned on and off in response to press and return movements of said ornament into and from said covering;
a biasing member provided on a back surface side of said covering, and receiving a pressing force of said ornament and biasing said ornament in a return direction upon abutment against a back-surface-side projection of said biasing projection, said back-surface-side projection passing through said through hole to project toward the back surface side of said covering; an
a fixing member including a bottom fixing plate portion configured to be disposed on the bottom of said recessed portion and a fixing projection projecting toward a back surface side of said bottom fixing plate portion,
wherein a fixing through hole is formed in the bottom of said recessed portion such that said fixing projection is arranged to pass therethrough, and
wherein said biasing member is fixed to a tip portion of the back-surface-side projecting part of said fixing projection so as to be fixed to said covering, said back-surface-side projecting part passing through said fixing through hole and projecting toward said back surface side of said covering.

15. The horn switch device according to claim 14, wherein:
said plurality of biasing projections are provided along the outer periphery of said ornament; and
said fixing projection is fixed to said biasing member at approximately a center position surrounded by said plurality of biasing projections.

16. The horn switch device according to claim 14, wherein:
said switch mechanism includes a sheet-like switch and a switch pressing portion provided to project on a back surface side of said ornament; and
at least a part of said sheet-like switch is sandwiched between the bottom of said recessed portion and said bottom fixing plate portion.

17. The horn switch device according to claim 16, wherein:
said sheet-like switch includes a contact portion entering a contact state upon pressing of said switch pressing portion;
a pressing-portion insertion hole is formed in said bottom fixing plate portion such that said switch pressing portion is inserted thereinto; and
said bottom fixing plate portion covers a periphery of said contact portion of said sheet-like switch.

18. The horn switch device according to claim 14, wherein:
said biasing projection includes an anti-dropping abutment surface facing a proximal end side thereof; and
said ornament is prevented from dropping in a return direction thereof upon abutment of said anti-dropping abutment surface against said bottom fixing plate portion.

19. The horn switch device according to claim 14, wherein said switch mechanism includes a first contact portion provided on a covering side and a second contact portion provided on an ornament side, said first contact portion and said second contact portion being provided at positions so as to come into contact with each other upon pressing of said ornament.

20. An airbag device, comprising:
the horn switch device according to claim 19; and
an airbag mechanism included in said covering.

21. An airbag device, comprising:
the horn switch device according to claim 14; and
an airbag mechanism included in said covering.

* * * * *